(12) United States Patent
Kovi et al.

(10) Patent No.: US 11,447,513 B2
(45) Date of Patent: Sep. 20, 2022

(54) PURIFICATION PROCESS OF FERRIC CARBOXYMALTOSE

(71) Applicant: RK Pharma Solutions LLC, Piscataway, NJ (US)

(72) Inventors: Ravishanker Kovi, Monroe Township, NJ (US); Jayaraman Kannapan, Vadodara (IN); Hemant Mande, Vadodara (IN); Rajesh Patel, Vadodara (IN); Ritesh H Panchal, Dahod (IN); Varun L Zambare, Vadodara (IN)

(73) Assignee: RK PHARMA INC., Pearl River, NY (US)

(*) Notice: Subject to any disclaimer, the term of this patent is extended or adjusted under 35 U.S.C. 154(b) by 0 days.

(21) Appl. No.: 17/174,286

(22) Filed: Feb. 11, 2021

(65) Prior Publication Data

US 2021/0277041 A1   Sep. 9, 2021

(30) Foreign Application Priority Data

Feb. 12, 2020   (IN) .............................. 202021006073

(51) Int. Cl.
   *C07F 15/02*   (2006.01)
(52) U.S. Cl.
   CPC .................................. *C07F 15/025* (2013.01)
(58) Field of Classification Search
   CPC ........ C07F 15/02; C07F 15/025; C08B 31/18; C08B 3/10; C07H 3/06; C08L 3/10
   See application file for complete search history.

(56) References Cited

U.S. PATENT DOCUMENTS

| | | | | |
|---|---|---|---|---|
| 3,076,798 A | * | 2/1963 | Mueller | A61K 33/26 536/103 |
| 7,612,109 B2 | * | 11/2009 | Geisser | A61K 31/295 514/502 |
| 9,376,505 B2 | * | 6/2016 | Geisser | C08B 30/18 |
| 10,414,831 B2 | * | 9/2019 | Andreasen | A61P 7/06 |
| 2006/0205691 A1 | * | 9/2006 | Geisser | A61K 45/06 514/59 |
| 2012/0214986 A1 | * | 8/2012 | Mohan Rao | C07H 23/00 536/121 |
| 2018/0105609 A1 | * | 4/2018 | Siripalli | C08B 31/18 |
| 2021/0155651 A1 | * | 5/2021 | Srinivasan | C08B 30/18 |

FOREIGN PATENT DOCUMENTS

| | | | | |
|---|---|---|---|---|
| CN | 113018256 A | * | 6/2021 | |
| EP | 3339329 A1 | * | 6/2018 | |
| IN | 3463/MUM/2011 A | * | 6/2013 | |
| WO | WO-2016151367 A1 | * | 9/2016 | ............... C08L 3/10 |
| WO | WO-2016181195 A1 | * | 11/2016 | ............. C08B 30/18 |

OTHER PUBLICATIONS

O. Tabasi et al., 9 Pharmaceutical Nanotechnology, 157-163 (2021) (Year: 2021).*
S. Neiser et al., Biometals (2015) (Year: 2015).*

* cited by examiner

*Primary Examiner* — Alexander R Pagano
(74) *Attorney, Agent, or Firm* — Antonio Papageorgiou

(57) ABSTRACT

The present application provides processes for the purification of ferric carboxymaltose, the process includes the steps of dissolving crude ferric carboxymaltose in a first solvent; charging the ferric carboxymaltose solution in a reaction vessel with a second solvent and precipitating therefrom a ferric carboxymaltose precipitate; and isolating pure ferric carboxymaltose from the ferric carboxymaltose precipitate.

8 Claims, 3 Drawing Sheets

Fig. 1 – Ferric Carboxymaltose - Formula I

PURIFICATION PROCESS OF FERRIC CARBOXYMALTOSE

FIELD OF THE INVENTION

The present application relates to methods for the purification of ferric carboxymaltose and more specifically ferric carboxymaltose of formula I. The application is further directed to pharmaceutical compositions containing highly purified ferric carboxymaltose and also the use of this highly purified ferric carboxymaltose composition for the treatment of iron deficiency and related diseases.

BACKGROUND OF THE INVENTION

Ferric carboxymaltose (INJECTAFER®) is used as an iron replacement product for intravenous administration. Injectafer, is an iron replacement product having iron carbohydrate complex with the chemical name of polynuclear iron (III) hydroxide 4(R)-(poly-(1→4)-O-α-Dglucopyranosyl)-oxy-2(R),3(S),5(R),6-tetrahydroxy-hexanoate. It has a relative molecular weight of approximately 150,000 Da corresponding to the following empirical formula:

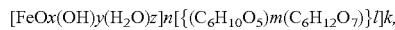

where $n \approx 10^3$, $m \approx 8$, $l \approx 11$, and $k \approx 4$. (l represents the mean branching degree of the ligand). The structure of ferric carboxymaltose is represented in formula I, shown in FIG. 1.

Injectafer (ferric carboxymaltose injection) is a dark brown, sterile, aqueous, isotonic colloidal solution for intravenous injection. Each mL contains 50 mg iron as ferric carboxymaltose in water for injection. Injectafer is available in 15 mL single-use vials. Sodium hydroxide and/or hydrochloric acid may have been added to adjust the pH to 5.0-7.0.

U.S. Pat. No. 3,076,798, which is incorporated herein by reference, discusses a process for the preparation of ferric carboxymaltose. Ferric carboxymaltose is available in wide range of molecular weight. It contains in range of 20,000 to 500,000 dalton.

Another kind of process for the preparation of ferric carboxymaltose is discussed in U.S. Pat. No. 7,612,109, which is also incorporated herein by reference. This patent generally discusses the preparation of water-soluble iron carbohydrate complexes (ferric carboxymaltose complexes) obtained from an aqueous solution of an iron (III) salt, preferably iron (III) chloride, and an aqueous solution of the oxidation product of one or more maltodextrins using an aqueous hypochlorite solution. The aforementioned process does not isolate the oxidised maltodextrin in process, which leads to high molecular impurity and lower yield of ferric carboxymaltose. Thus, there is a need for a process for the preparation of Ferric carboxymaltose with better purity and yield.

Patent Publication US20120214986, also incorporated herein by reference, discusses a process for the preparation of ferric carboxymaltose complex using ferric hydroxide. The obtained ferric maltodextrin complex is oxidized using aqueous sodium hypochlorite solution to yield ferric carboxymaltose. Application CN106977621, which is incorporated herein by reference, also discusses the process for the preparation of ferric carboxymaltose.

Indian application 3463/MUM/2011, which is incorporated herein by reference, also discusses the use of sodium hypochlorite solution as oxidising agent in the preparation of ferric carboxy maltose. Additionally, the applicants claimed alkali bromide and 2,2,6,6,-tetramethypiperidine-1-oxyl (TEMPO) as an oxidising agent. Indian application 3474/CHE/2013, which is incorporated herein by reference, discusses the process for preparation ferric carboxymaltose by oxidation maltodextrin with peroxide, and ferric hydroxide or iron hydroxide maltodextrin complex in the presence of sodium tungstate as a catalyst.

Patent Publication US20180105609, which is incorporated herein by reference, discusses a process for the preparation of ferric carboxymaltose complex by reacting ferric salt with oxidised product of maltodextrin. The oxidised product of maltodextrin is obtained by using catalyst and a phase transfer catalyst in alkaline media. As mentioned in this application, the product obtain by this process is has a molecular weight in range of 80,000 dalton to 400,000 dalton.

The obtained molecular weight is generally not suitable for use in pharmaceutical products, so an additional purification step is performed which is costly and difficult to apply on a large scale. Moreover, catalyst and phase transfer catalyst may be required which is expensive.

The process for the preparation of ferric carboxymaltose complex described in the aforementioned art therefore suffers from disadvantages, such as the use of excess amounts of maltodextrin, thereby generating a large number of impurities, which are difficult to purify. Moreover, the use of highly corrosive and toxic catalysts and phase transfer catalysts, results in a poor product quality.

Hence, the ferric carboxymaltose obtained by the process described in the art is not suitable for the preparation of ferric carboxymaltose in a lab scale and in commercial scale operations without further purification.

Based on the aforementioned drawbacks, the prior processes have been found to be unsuitable for the preparation of ferric carboxymaltose.

Since improved drug formulations are consistently sought, there is an ongoing need for the purest form of any existing drug substance. For at least these reasons, there is a need for development of process for the purification of ferric carboxymaltose that are not so limited. As outlined herein, Applicants disclose novel, improved, and environmentally friendly purification process(es) for the preparation of ferric carboxymaltose complex which are preferably substantially free of impurities.

SUMMARY OF THE INVENTION

The present application provides process for the purification of ferric carboxymaltose, preferably of formula I.

In one of the embodiment, the present application provides purification process for preparing a pure ferric carboxymaltose, comprising steps of:
a. providing a crude ferric carboxymaltose in a preferable solvent and at suitable temperature,
b. charging the above solution in another solvent to get a precipitated ferric carboxymaltose/product, and
c. isolation of pure ferric carboxymaltose.

Pure ferric carboxymaltose can also be obtained by making slurry of crude ferric carboxymaltose in suitable solvent, followed by filtering and washing with suitable solvent to get pure product. Another way is binding crude ferric carboxymaltose with resin or adsorbent and performing column chromatography to get the pure compound.

In another embodiment of the present application, oxidised maltodextrin is isolated which is used in a subsequent step to get ferric carboxymaltose crude. Isolation of oxidised maltodextrin helps to improve the purity and yield of the ferric carboxymaltose crude. A schematic process for the preparation of ferric carboxymaltose is depicted in FIG. 2.

In another embodiment, a process for the purification of ferric carboxymaltose is provided that includes the steps of dissolving crude ferric carboxymaltose in a first solvent; charging the ferric carboxymaltose solution in a reaction vessel with a second solvent and precipitating therefrom a ferric carboxymaltose precipitate; and isolating pure ferric carboxymaltose from the ferric carboxymaltose precipitate.

In at least one embodiment, the pure ferric carboxymaltose includes ferric carboxymaltose of formula I.

In at least one embodiment, the process includes oxidizing maltodextrin; and reacting the oxidised maltodextrin further with a ferric source therewith providing the crude ferric carboxymaltose.

In at least one embodiment, the process includes isolating the oxidizing maltodextrin and wherein the isolated maltodextrin is reacted with the ferric source.

In at least one embodiment, the maltodextrin is oxidized with a sodium hypobromite solution in process water.

In at least one embodiment, the ferric source includes ferric chloride, and wherein reacting the oxidized maltodextrin in ferric chloride includes reacting the oxidized maltodextrin in ferric chloride in process water solution, in the presence of sodium carbonate as a base.

In at least one embodiment, oxidizing maltodextrin includes providing a maltodextrin and water solution having a concentration of about 0.25 g/ml to about 0.50 g/ml; adding about 10% of the weight of water sodium hypobromite solution at a pH of about 9 to about 12 thereto; and stirring for sufficient time to yield oxidised maltodextrin.

In at least one embodiment, charging the ferric carboxymaltose solution in a reaction vessel includes charging in the reaction vessel a ferric chloride hexahydrate and process water solution having a concentration of about 0.4 g/ml to about 0.6 g/ml and wherein reacting the oxidised maltodextrin with the ferric source comprises charging the oxidised maltodextrin reaction mass into the ferric chloride solution at RT.

In at least one embodiment, the first or second solvent comprises at least one of an acidic solvent and an organic solvent.

In at least one embodiment, wherein the first or second solvent comprises at least one of an alcoholic, a ketone solvent, or a mixture thereof.

In at least one embodiment, the process includes preheating filtering equipment and filtering the crude ferric carboxymaltose and the first solvent solution.

In at least one embodiment, the ferric carboxymaltose crude has an iron content of about 24% to about 32% weight/weight.

In at least one embodiment, the ferric carboxymaltose crude has a molecular weight of about 120 kDa to about 200 kDa.

In at least one embodiment, the process includes washing the isolated pure ferric carboxymaltose with a solvent and drying the washed ferric carboxymaltose.

In at least one embodiment, the crude ferric carboxymaltose and first solvent solution has a concentration of about 0.20 g/ml to about 0.33 g/ml.

In at least one embodiment, the process includes charging sodium chloride into the reaction vessel, heating the crude ferric carboxymaltose solution to between about 50° C. to about 60° C., filtering the reaction mass and removing therefore undissolved particulate, adding an alcoholic solvent to the filtrate and stirring for a sufficient amount of time and at a temperature of between about 15° C. to about 30° C., therewith producing the ferric carboxymaltose precipitate, and filtering, washing and drying the ferric carboxymaltose precipitate to yield ferric carboxymaltose API.

In at least one embodiment, pure ferric carboxymaltose is provided obtained with the process(es) disclosed herein.

In at least one embodiment, a pharmaceutical composition is provided that includes pure ferric carboxymaltose obtained as disclosed herein and at least one pharmaceutically acceptable excipient.

DESCRIPTION OF THE INVENTION

Embodiments of the present application now will be described more fully hereinafter with reference to the accompanying examples and experiments, in which illustrative embodiments of the application are shown. This application may, however, be embodied in many different forms and should not be construed as limited to the embodiments set forth herein; rather, these embodiments are provided so that this disclosure will be thorough and complete, and will fully convey the scope of the application to those skilled in the art. Well-known functions or constructions may not be described in detail for brevity and/or clarity.

The terminology used herein is for the purpose of describing particular embodiments only and is not intended to be limiting of the application. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All percentages and ratios used herein are by weight of the total composition and all measurements made are at 25° C. and normal pressure unless otherwise designated. All temperatures are in degrees Celsius unless specified otherwise.

As used herein, "comprising" means the elements recited, or their equivalent in structure or function, plus any other element or elements which are not recited. The terms "having" and "including" are also to be construed as open ended unless the context suggests otherwise.

All ranges recited herein include the endpoints, including those that recite a range "between" two values.

In a first embodiment, the present application provides Ferric carboxymaltose of formula I, preferably having improved qualities as discussed herein.

In a second embodiment, the present application provides process for preparing a crude ferric carboxymaltose, comprising steps of:
I. Reacting a maltodextrin with sodium hypobromite solution in process water to provide oxidised maltodextrin; and II. Reacting the oxidised maltodextrin further with ferric chloride in process water, in presence of sodium carbonate as base, to provide crude ferric carboxymaltose.

In present application, maltodextrin may be oxidised using sodium hypobromite as an oxidising agent, which helps to improve stability of the oxidising agent, and the purity and yield of the ferric carboxymaltose crude.

Figure 1:
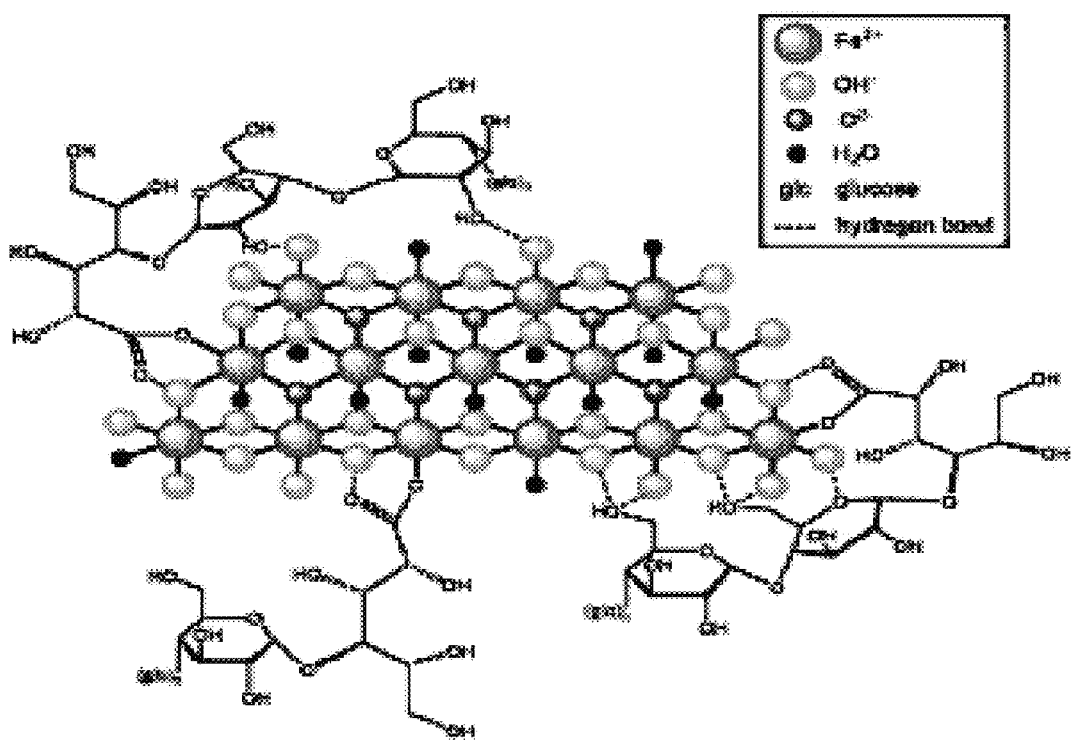
FIG. 1 depicts a representation of ferric carboxymaltose Formula 1.
Figure 2:
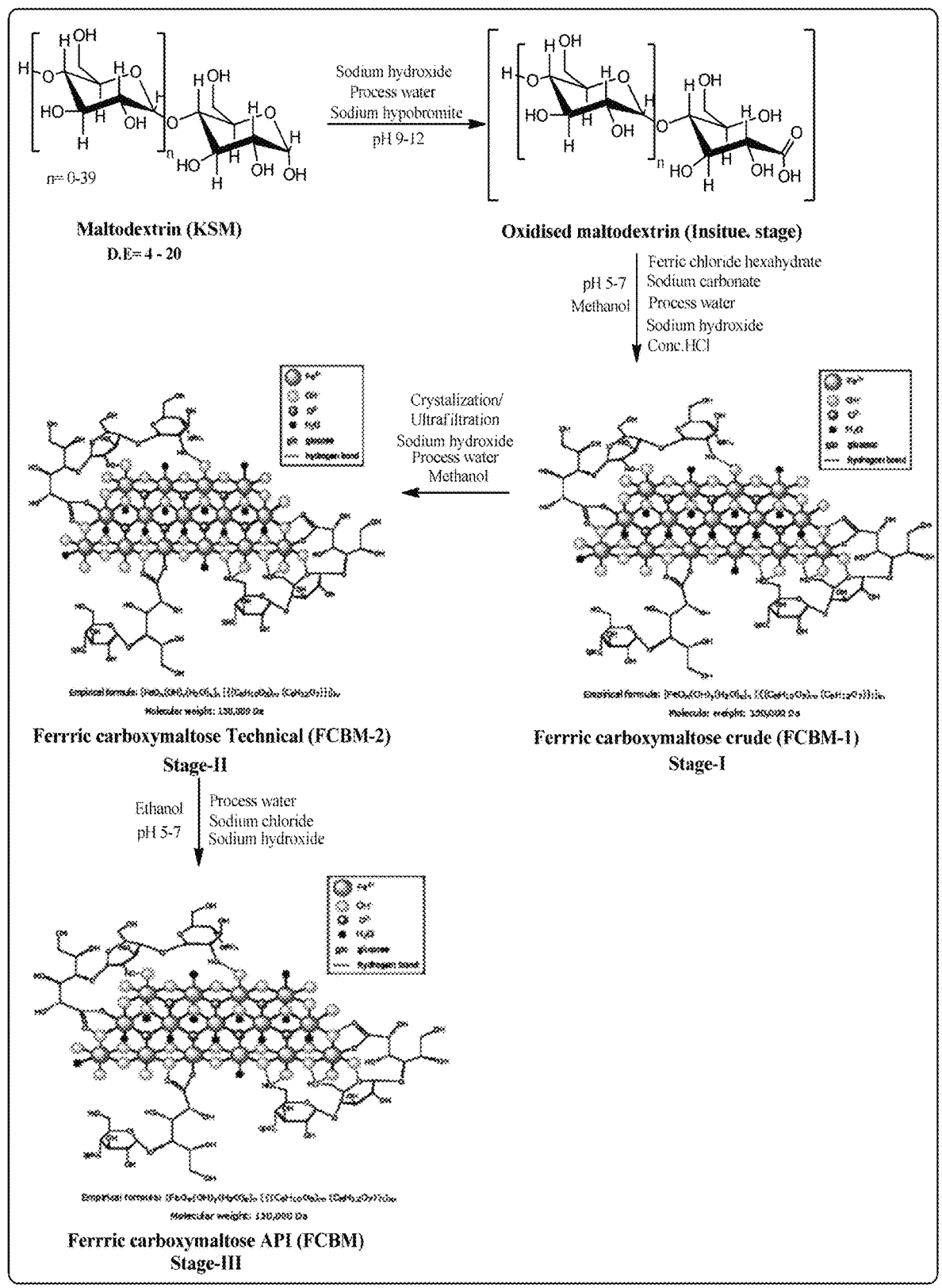
FIGS. 2-4 depict processes for the preparation of ferric carboxymaltose according to at least one embodiment of the processes disclosed herein.
Figure 3:
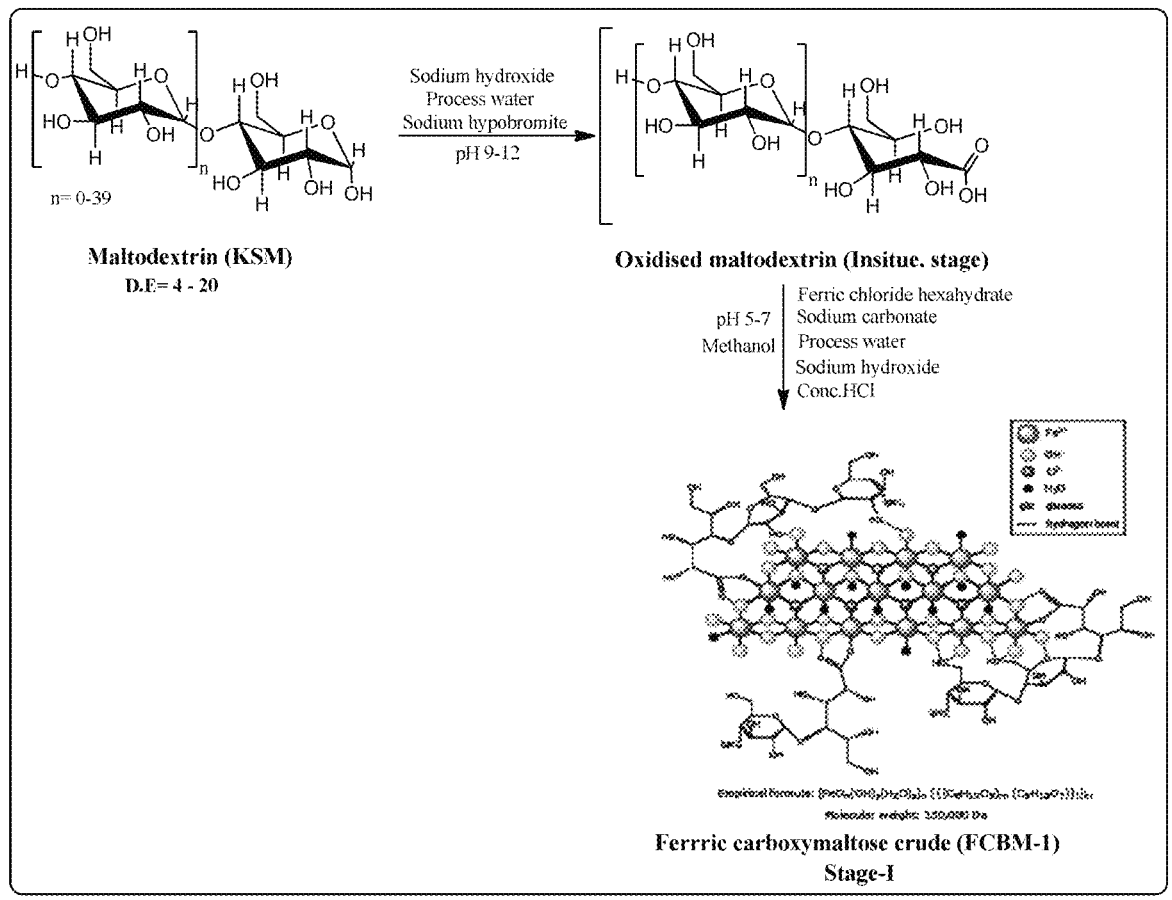

A schematic of the process for preparing a ferric carboxymaltose according to at least one embodiment is represented in FIG. 3.

In a third embodiment, the present application provides a purification process for preparing pure ferric carboxymaltose. The term pure generally means having a purity of at least about 95% or preferably at least about 98%.

Figure 4:
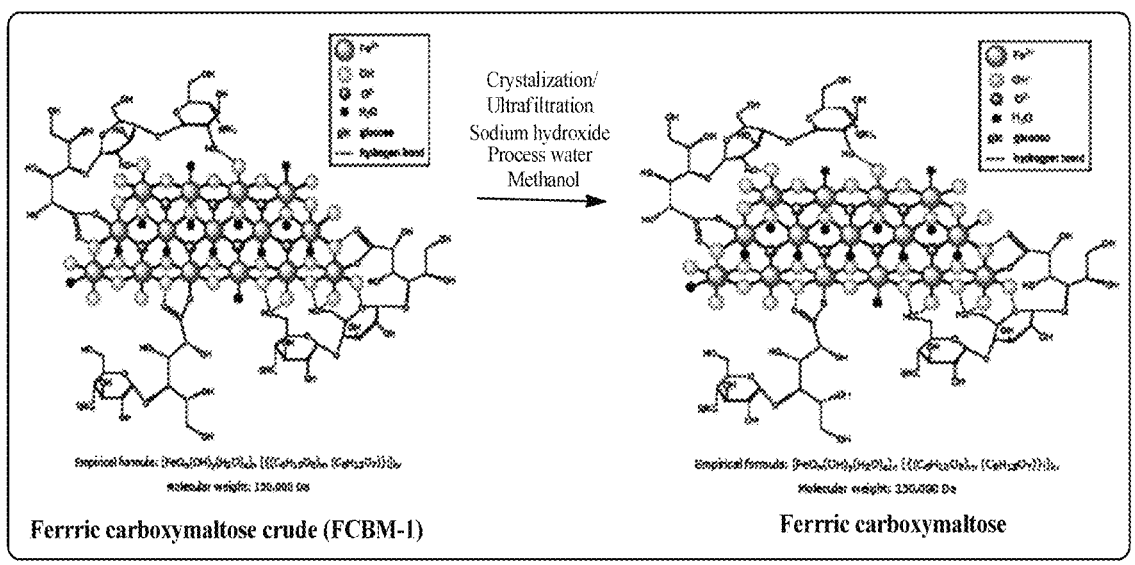

A schematic of the process for preparing a ferric carboxymaltose according to at least one embodiment is depicted in FIG. 4.

In this embodiment, the purification process for the ferric carboxymaltose comprises steps of:
 a. providing a crude ferric carboxymaltose in a preferable solvent and at a suitable temperature,
 b. charging the above solution in another solvent to get precipitated product (ferric carboxymaltose), and
 c. isolating pure ferric carboxymaltose therefrom.

Providing a solution in step a) may include;
 1) directly using the reaction mixture containing ferric carboxymaltose, which is obtained in the course of its synthesis; or
 2) directly using the reaction mixture containing Ferric carboxymaltose, which is obtained by treating a source of ferric with maltodextrin; or
 3) dissolving crude ferric carboxymaltose in a solvent.

Any physical form of ferric carboxymaltose may be utilized in step (a) of the process embodiments herein above.

Suitable solvents which can be used in step (a) for the purification of ferric carboxymaltose includes acidic solvents, such as formic acid, acetic acid, propionic acid, trifluro acetic acid, methane sulphonic acid, and the like. Organic solvents, such as N-Methyl-Pyrrolidone, dimethyl sulfoxide, dimethyl formamide, dimethyl acetamide, acetone, MEK, MIBK, methanol, ethanol, IPA, butanol, and the like may be used.

Step (a) is performed at suitable temperature, which may be include performing at room temperature or at below boiling temperature of the solvent.

The solution obtained in step (a) may be filtered to remove any insoluble particles. Suitable techniques to remove insoluble particles are filtration, micron filter, centrifugation, decantation, and any other techniques known in the art. The solution can be filtered by passing through paper, or other membrane material, or a clarifying agent such as celite. Depending upon the equipment used and the concentration and temperature of the solution, the filtration apparatus may need to be preheated to avoid premature precipitation of solid.

Step (b) involves charging the solution of step (a) into another suitable solvent. Suitable solvent is preferably selected from alcoholic solvents, such as methanol, ethanol, or n-butanol, and the like; or ketone, such as acetone, butanone and cyclopentanone.

Step (c) involves isolation of pure ferric carboxymaltose from the reaction vessel. The isolation of crystalline ferric carboxymaltose may be induced by using conventional techniques known in the art. For example, useful techniques include but are not limited to concentrating, cooling, stirring, shaking, combining with an anti-solvent, adding seed crystals, evaporation, flash evaporation, simple evaporation, rotational drying, or the like. Evaporation as used herein refers to distilling of solvent almost completely at atmospheric pressure or under reduced pressure. Flash evaporation as used herein refers to distilling of solvent by using a technique includes but is not limited to tray drying, fluidized bed drying. The recovery of crystalline can be done by decantation, centrifugation, gravity filtration, suction filtration, and the like.

In addition, ferric carboxymaltose can also be purified by making the slurry in suitable solvent, stirring for suitable amount of time, filtering the solution, and washing with suitable solvent. Suitable solvent to make slurry is selected from acetic acid, propionic acid, and the like. Solvent for washing is selected from the methanol, ethanol, or acetone.

Another way of purifying ferric carboxymaltose is dissolving crude ferric carboxymaltose in suitable solvent followed by binding to a resin and performing column chromatography to get the high pure fractions of required-molecular weight and removal of high/low molecular weight from ferric carboxymaltose. In a particular application, the suitable solvent is water and chromatographic technique used is size exclusion chromatography. Resin is preferably selected from Sepax-Monomix 30 um/1000 A, HP20/HP-20SS or the like.

Ferric carboxymaltose obtained by these processes have a molecular weight in the range of 120 kilo-dalton to 200 kilo-dalton. Process is developed separately for the removal of low molecular weight impurities from crude ferric carboxymaltose.

The resulting solid ferric carboxymaltose that is obtained may carry a small proportion of occluded mother liquor containing a higher percentage of impurities and, if desired, the solid may be washed with a solvent to wash out the mother liquor. In a particular embodiment, the solid is washed with alcoholic solvent, such as methanol, ethanol, or n-butanol and the like and/or ketone, such as acetone, butanone and cyclopentanone.

The isolated solid may optionally be further dried to afford dry ferric carboxymaltose. Drying can be carried out in a tray dryer, vacuum oven, air oven, Buchi®, Rotavapor®, cone vacuum dryer, rotary vacuum dryer, fluidized bed dryer, spin flash dryer, flash dryer, gravity oven, or the like. The drying can be carried out at less than about 50° C., or any other suitable temperatures; at atmospheric pressure or under a reduced pressure, as long as the ferric carboxymaltose is not degraded in its quality. The drying can be carried out for any desired times until the required product quality is achieved. Suitable time for drying can vary from few minutes to several hours for example from about 30 minutes to about 24 or more hours.

In a fourth embodiment, the present application provides pharmaceutical formulations comprising pure ferric carboxymaltose with one or more pharmaceutically acceptable excipients.

Certain specific aspects and embodiments of the present application will be explained in more detail with reference to the following examples, which are provided only for purposes of illustration and should not be construed as limiting the scope of the present application in any manner. For a better understanding, the process is divided into categories:
 1. For high molecular weight impurities removal, and
 2. For low molecular weight impurities removal.

EXAMPLES

Preparation of Ferric Carboxymaltose Crude a) Preparation of Oxidised Maltodextrin About 100 g of maltodextrin is dissolved in about 200 to 400 ml, preferably about 300 ml of water at room temperature (RT), or generally having a concentration of about 0.25 to about 0.50 g/ml, preferably about 0.33 g/ml. About 20 ml to about 40 ml sodium hypobromite solution, preferably 30 ml or about 10% of the weight of solvent/water (about 10 to about 20 weight percent active bromine) was added to the above solution at pH about 9 to about 12 and stirred for sufficient time, about 60 minutes at RT to get oxidised maltodextrin. This solution has a concentration of about 0.20 g/ml to about 0.50 g/ml oxidised maltodextrin.

b) Preparation of Ferric Carboxymaltose Crude

Ferric chloride hexahydrate solution having a concentration of about 0.4 g/ml to about 0.6 g/ml (3 to 5 volumes) ferric chloride hexahydrate) was charged into a round bottom (RB) Flask at RT. Oxidised maltodextrin reaction mass from above step (a) was then charged into ferric chloride solution at RT. Sodium carbonate solution was slowly added thereto and the pH was set from about 6 to about 6.5.

Further, the pH was adjusted to about 11 to about 12 with the addition of sodium hydroxide. The solution was then heated to about 50° C. and stirred at about 50° C. for about 60-90 minutes. The pH of the reaction mass was then adjusted from about 5-about 6 with the addition of hydrochloric acid solution. The solution was stirred at about 50° C. for a further about 30 minutes and then heated to about 95° C.-about 105° C. and stirred for about 30 minutes at about 95° C.-about 105° C. After cooling the solution to room temperature, the pH was adjusted from about 5-about 6 with the addition of sodium hydroxide. The solution was then filtered through a micron filter and the material was isolated by precipitation with methanol (about 0.75 to 0.95 volumes of filtrate mass). The solid/precipitate was dried in vacuum oven at below about 50° C.

The solid obtained was light brown to dark brown amorphous powder having an iron content of about 24%-about 32% weight/weight (by ICP-OES). The yield of ferric carboxymaltose crude was about 100 g to about 120 g, preferably 110 g and the molecular weight: about 120 kDa to about 200 kDa by GPC.

Preparation of Ferric Carboxymaltose Active Pharmaceutical Ingredient (API)

About 100 g of crude ferric carboxymaltose was dissolved into about 300 to about 500 ml of process water at RT. About 20 gm to about 40 gm, preferably 30 gm of sodium chloride was charged into the reaction mass and the solution was heated from about 50° C. to about 60° C. The reaction mass was filtered to remove undissolved particulate. Ethanol (about 25 to about 35 volumes) was added into the clear filtrate at about 15° C.-about 30° C. and stirred for about 1 h. The product was filtered and washed with about 200 ml of ethanol and dried at about 50° C. to about 70° C., which yielded about 75 g to about 105 g ferric carboxymaltose API.

Purification Process for High Molecular Weight Removal

Example 1

Dissolved about 1 g of crude ferric carboxymaltose into about 3 ml-about 8 ml of Formic acid at RT. The solution is filtered to remove undissolved particulate. The filtered solution was then added dropwise into methanol (about 9 ml-about 24 ml) at about 15° C.-about 30° C. and stirred for about 1 h. The precipitated material was filtered, washed with about 1 ml-about 2 ml of methanol and dried at about 50° C. The yield was about 0.7 g to about 0.8 g.

Example 2

Dissolved about 1 g of crude ferric carboxymaltose into about 3 ml-about 8 ml of Formic acid at RT. The solution is filtered to remove undissolved particulate. The filtered solution was then added dropwise into acetone (about 9 ml-about 24 ml) at 15° C.-about 30° C. and stirred for about 1 h. The precipitated material filtered, washed with about 1 ml-about 2 ml of methanol/acetone mixture and dried at about 50° C. The yield was about 0.7 g to about 0.8 g.

Example 3

About 1 g of ferric carboxymaltose slurred and stirred for about 1 h into about 3 ml-about 8 ml of acetic acid at RT. The slurry material was filtered, washed with about 1 ml-about 2 ml of methanol/acetone and dried at about 50° C. The yield was about 0.8 g to about 0.9 g.

Example 4

About 1 g of ferric carboxymaltose slurred and stirred for about 30 min into about 3 ml-about 8 ml of acetic acid at about 60° C. The hot slurry material was filtered, washed with about 1 ml-about 2 ml of methanol/acetone and dried at about 50° C. The yield was about 0.75 g to about 0.85 g.

Example 5

Dissolved about 1 g of crude ferric carboxymaltose into about 15 ml of N-Methyl-2-Pyrrolidon (NMP) at about 70° C. The solution was filtered to remove undissolved particulate. The filtered solution was then added dropwise into acetone/methanol (about 40 ml) at about 15° C.-about 30° C. and stirred for about 1 h. The precipitated material filtered, washed with about 5 ml of acetone/methanol and dried at about 50° C. The yield was about 0.7 g to about 0.8 g.

Example 6

Dissolved about 1 g of crude ferric carboxymaltose into about 15 ml of NMP at 70° C. The solution was filtered to remove undissolved particulate. The filtered solution then added dropwise into acetic acid (about 30 ml) at 15-30° C. and stirred for about 1 h. The precipitated material filtered, washed with about 5 ml of acetone/methanol and dried at about 50° C. The yield was about 0.7 g to about 0.8 g.

Example 7

About 1 g of ferric carboxymaltose was slurred and stirred for about 30 min into about 15 ml of propionic acid at about 60° C. The hot slurry material was filtered, washed with about 5 ml of methanol/acetone and dried at about 50° C. The yield was about 0.8 g to about 0.9 g.

Example 8

Dissolved about 1 g of crude ferric carboxymaltose into about 3 ml-about 10 ml of Dimethylis Sulfoxidum (DMSO) at RT. The solution was filtered to remove undissolved particulate. The filtered solution was then added dropwise into methanol/acetone (about 10-about 40 ml) at about 15° C.-about 30° C. and stirred for about 1 h. The precipitated material filtered, washed with about 5 ml of methanol/acetone and dried at about 50° C. The yield was about 0.9 g.

Example 9

Dissolved about 1 g of crude ferric carboxymaltose into about 10-about 15 ml of Dimethylformamide (DMF) at RT. The solution was filtered to remove undissolved particulate. The filtered solution was then added dropwise into methanol/acetone (about 15-about 40 ml) at about 15° C.-about 30° C. and stirred for about 1 h. The precipitated material filtered, washed with about 5 ml of methanol/acetone and dried at about 50° C. The yield was about 0.9 g.

Example 10

Dissolved about 1 g of crude ferric carboxymaltose into 3 ml to about 8 ml of trifluro acetic acid at RT. The solution was filtered to remove undissolved particulate. The filtered solution was then added dropwise into methanol/acetone (about 15-about 40 ml) at 15-about 30° C. and stirred for about 1 h. The precipitated material filtered, washed with about 5 ml of methanol/acetone and dried at about 50° C. The yield was about 0.85 g.

Example 11

About 1 g of crude ferric carboxymaltose dissolved into about 5 ml of water and adsorbed on silica (about 2 g) at about 30° C. The adsorbed silica was loaded on prepacked column of Size Exclusion Chromatography resin Sepax-Monomix 30 um/1000 A. Column was run with water as a mobile phase to get a fraction without high molecular weight. The yield of low molecular weight ferric carboxymaltose API was about 0.55 g.

Example 12

About 1 g of crude ferric carboxymaltose dissolved into about 15 ml of water and passed through a LV (PES 200 kD)/LX (PES 300 kD) MWCO membrane element in sanitary construction (Synder) 30° C. Slow filtration resulted into fractions without high molecular weight. The yield of low molecular weight ferric carboxymaltose API was about 0.6 g.

Purification Process for Low Molecular Weight Removal

Example 13

About 1 g of crude ferric carboxymaltose slurred into about 11 ml of Ethanol: Water: Conc. HCl (about 5 mL: about 5 mL: about 1 mL, respectively) mixture at about 55° C. and stirred for about 1 h. The hot slurry material was filtered, washed with about 5 ml of methanol/acetone and dried at about 50° C. The yield of ferric carboxymaltose API was about 0.65 g.

Example 14

About 1 g of crude ferric carboxymaltose was dissolved into about 5 ml of water and adsorbed on silica (about 2 g) at about 30° C. The adsorbed silica was loaded on prepacked column of Size Exclusion Chromatography resin HP20/HP-20SS. The column was run with water as a mobile phase to get fractions without low molecular weight. Low molecular weight gets adsorbed/trapped in resin to get separation. The yield of high molecular weight ferric carboxymaltose API was about 0.75 g.

Example 15

About 1 g of crude ferric carboxymaltose was dissolved into about 10 ml of water and product was isolated by using about 0.85 volume methanol. Low molecular weight gets removed in filtrate mass, yielding about 0.75 g.

Although the formulations, compositions, schemes and methods of the present disclosure have been described with reference to exemplary embodiments thereof, the present disclosure is not limited thereby. Indeed, the exemplary embodiments are implementations of the disclosed methods are provided for illustrative and non-limitative purposes. Changes, modifications, enhancements and/or refinements to the disclosed methods may be made without departing from the spirit or scope of the present disclosure. Accordingly, such changes, modifications, enhancements and/or refinements are encompassed within the scope of the present invention. All publications, patent applications, patents, figures and other references mentioned herein are expressly incorporated by reference in their entirety.

The invention claimed is:

1. A process for the purification of ferric carboxymaltose, comprising:
    a. dissolving crude ferric carboxymaltose in a first solvent; wherein the crude ferric carboxymaltose and first solvent solution has a concentration of 0.20 g/ml to 0.33 g/ml;
    b. adding the ferric carboxymaltose solution obtained in step a to a reaction vessel that contains a second solvent and precipitating therefrom a ferric carboxymaltose precipitate; and
    c. isolating pure ferric carboxymaltose from the ferric carboxymaltose precipitate.

2. A process for the preparation of crude ferric carboxymaltose comprising:
    oxidizing aqueous solution of maltodextrin with sodium hypobromite, wherein concentration of aqueous solution of maltodextrin is 0.25 g/ml to 0.50 g/ml; and
    reacting the oxidized maltodextrin further with a ferric source therewith providing the crude ferric carboxymaltose.

3. The process of claim 2, wherein the ferric source comprises ferric chloride or ferric chloride hexahydrate, and wherein the step of reacting the oxidized maltodextrin with the ferric source comprises reacting the oxidized maltodextrin with an aqueous solution of ferric chloride or ferric chloride hexahydrate having a concentration of 0.4 g/ml to 0.6 g/ml, in the presence of sodium carbonate as a base.

4. The process of claim 1, wherein the first or second solvent comprises an acidic solvent, an alcoholic solvent, a ketone solvent, or an organic solvent or a mixture thereof.

5. The process of claim 2, wherein the crude ferric carboxymaltose is purified by
    a) charging sodium chloride into the crude ferric carboxymaltose aqueous solution,
    b) heating the reaction mixture to a temperature between 50° C. to 60° C.,
    c) filtering the reaction mass and removing therefore undissolved particulate, d) adding an alcoholic solvent to the filtrate and stirring for a sufficient amount of time at a temperature of between 5° C. to 30° C., therewith precipitating the ferric carboxymaltose precipitate, and e) filtering, washing and drying the ferric carboxymaltose precipitate to yield pure ferric carboxymaltose.

6. The process of claim 1, wherein the first solvent comprises an acid, an amide, a ketone, an alcohol or another organic solvent, or mixtures thereof.

7. The process of claim 1, wherein the second solvent comprises an alcohol, a ketone, or mixtures thereof.

8. The process of claim 7, wherein the second solvent comprises methanol, acetone or a mixture thereof.

* * * * *